United States Patent

Ichimura et al.

[19]

[11] Patent Number: 5,920,577
[45] Date of Patent: Jul. 6, 1999

[54] DIGITAL SIGNAL PROCESSING METHOD AND APPARATUS

[75] Inventors: Gen Ichimura, Tokyo; Masayoshi Noguchi, Chiba; Tadashi Fukami, Kanagawa, all of Japan

[73] Assignee: Sony Corporation, Tokyo, Japan

[21] Appl. No.: 08/715,429

[22] Filed: Sep. 18, 1996

[30] Foreign Application Priority Data

Sep. 21, 1995 [JP] Japan ..................... 7-243295

[51] Int. Cl.$^6$ ................................. H03M 13/00
[52] U.S. Cl. ............... 371/37.01; 371/21.1; 371/21.2; 371/39.1; 364/148.02; 364/148.03; 364/468.17; 364/469.02
[58] Field of Search .............. 371/37.01, 21.1, 371/21.2, 39.1; 341/143, 131, 247; 250/548; 370/331, 335; 375/296; 364/148.02, 148.03, 468.17, 469.02, 806

[56] References Cited

U.S. PATENT DOCUMENTS 5,005,089  4/1991  Thanos et al. .................. 360/77.08
5,594,791  1/1997  Pahr ................................ 250/548
5,648,238  7/1997  Yarrington .................... 340/146.1

*Primary Examiner*—William Grant
*Assistant Examiner*—McDieunel Marc
*Attorney, Agent, or Firm*—Jay H. Maioli

[57] ABSTRACT

To interpolate data produced in the course of transmission or recording/reproduction of $\Sigma,\Delta$ modulated 1-bit digital data an interleaver distributes input contiguous 1-bit audio data over a range broader than can be typically interpolated, an error detector performs 4-bit-width detection on the distributed data transmitted over a transmission channel, a deinterleaver deinterleaves the distributed output data for converting the distributed output data into the contiguous 1-bit audio data that existed prior to interleaving, at the same time as it reallocates the error detection information detected by the error detector in corresponding bit locations, and an interpolator specifies error data in output data of the deinterleaver using the error detection information produced by the error detector for interpolating the specified error data.

10 Claims, 9 Drawing Sheets

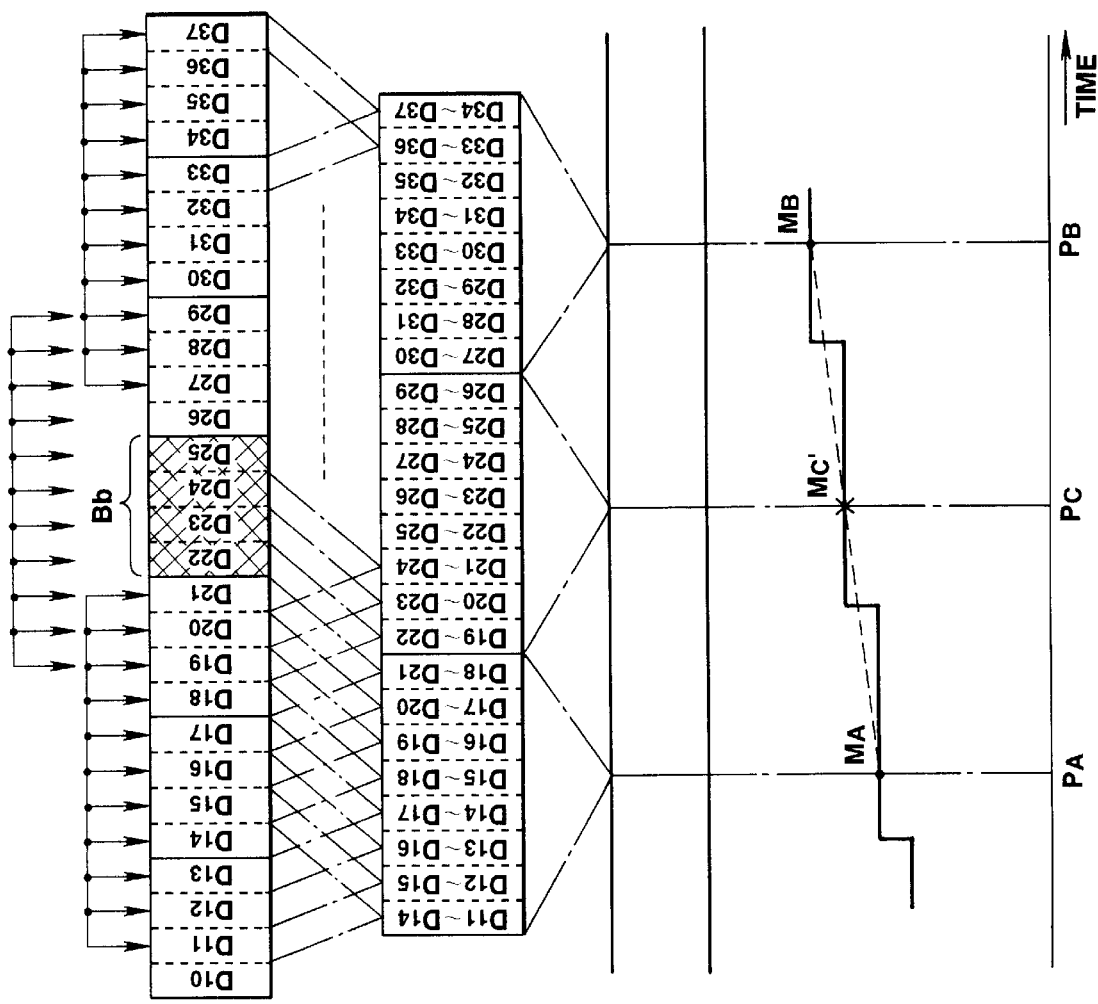
FIG.4A OUTPUT OF DEINTERLEAVER 23 (INCLUSIVE OF MALFUNCTIONING DATA BLOCK Bb)
FIG.4B 4-TAP MOVEMENT AVERAGED OUTPUT
FIG.4C 4-TAP PLUS 8-TAP MOVEMENT AVERAGED OUTPUT
FIG.4D INTERPOLATED DATA

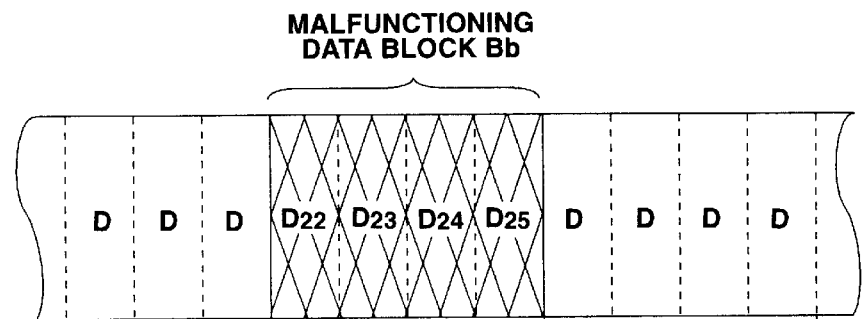
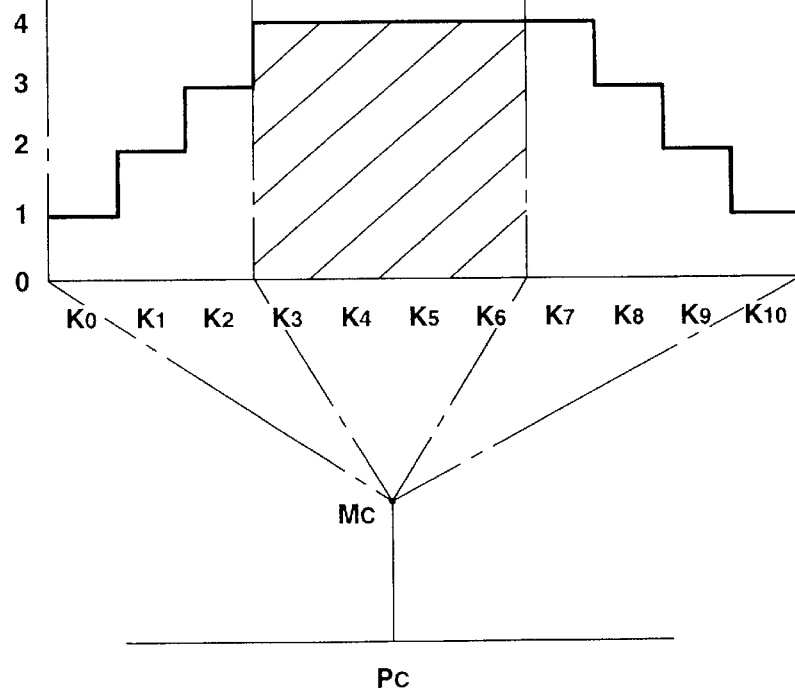

FIG.7A INPUT SIGNAL 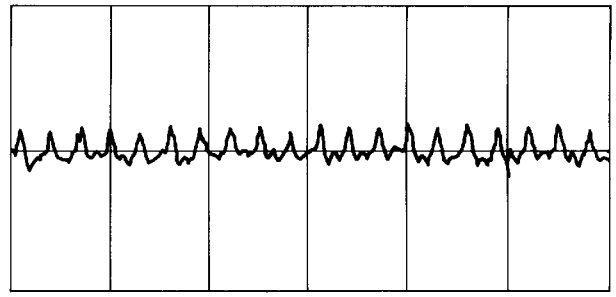
FIG.7B SIGNAL IN ERROR 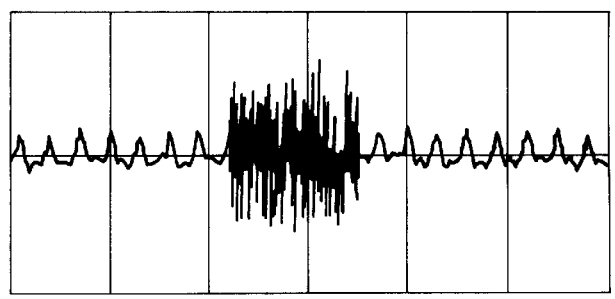
FIG.7C SIGNAL RESULTING FROM ERROR DATA INTERPOLATION WITHOUT INTERLEAVING /DEINTERLEAVING 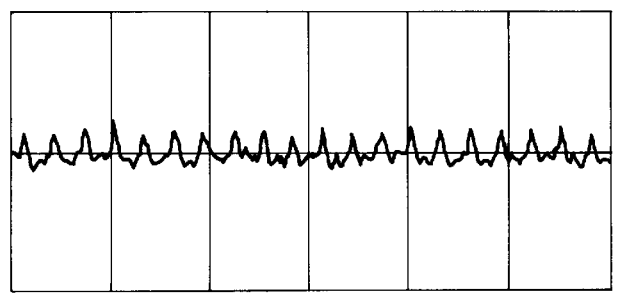
FIG.7D SIGNAL RESULTING FROM ERROR INTERPOLATION ACCORDING TO EMBODIMENT 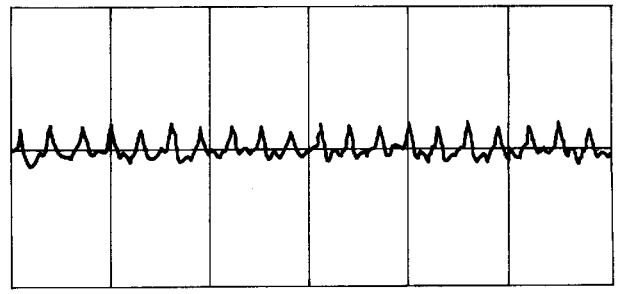

DIGITAL SIGNAL PROCESSING METHOD AND APPARATUS

BACKGROUND OF THE INVENTION

1. Field of the Invention

This invention relates generally to a method and apparatus for interpolating digital data and, more particularly, to interpolating defective data generated during transmission of digital data obtained by performing 1-bit digitization.

2. Description of the Background

The method of recording, reproducing and transmitting digital signals converted from analog signals has hitherto been practiced in the field of recording and/or reproducing apparatus employing an optical disc, such as a compact disc (CD), or a magnetic tape, such as a digital audio tape (DAT), or digital broadcasting, such as satellite broadcasting. In the conventional digital audio transmission apparatus, described above, the sampling frequency of 48 kHz or 44.1 kHz and 16 quantization bits have been prescribed as a format for conversion of the analog signals into digital signals.

With the above-described digital audio transmission apparatus, however, the number of quantization bits of the digital audio data generally determines the dynamic range of the demodulated audio signals. For transmitting high-quality audio signals it is necessary to increase the number of quantization bits from the current 16 bits to 20 or 24 bits. Once the number of quantization bits is fixed at a pre-set value, the signal processing system is correspondingly designed, the number of quantization bits cannot thereafter be increased and high-quality audio signals cannot be output from the conventional apparatus.

One method for digitizing audio signals is known as sigma-delta ($\Sigma\Delta$) modulation and was proposed by Y. Yamazaki in "AD/DA Converter and Digital Filter", J. of Japan Society of Acoustics, Vol. 46, No. 3 (1990), pages 251 to 257.

FIG. 8 shows the construction of a 1-bit $\Sigma\Delta$ modulation circuit. In this circuit the input audio signals are supplied at an input terminal 91 and fed via an adder 92 to an integration circuit 93. An output signal from the integrator 93 is supplied to a comparator 94 where it is compared to a neutral point potential of the input audio signal, not shown, so as to be quantized by one bit every sampling period. The frequency of the sampling period, that is, the sampling frequency, is 64 or 128 times the conventional frequency of 48 kHz or 44.1 kHz. The quantization may be 2-bit or 4-bit quantization, instead of the 1-bit quantization of this example.

The quantized data is supplied to a one-sample delay unit 95 and thereby delayed by one sampling period. The delayed data is converted by, for example, a 1-bit D/A converter 96 into an analog signal which is supplied to the adder 92 where it is added to the input audio signal fed in at the input terminal 91. The quantized data output by the comparator 94 is taken out at an output terminal 97. Consequently, with the sigma-delta ($\Sigma\Delta$) modulation, performed by the $\Sigma\Delta$ modulation circuit, audio signals of a broader dynamic range can be obtained, even with a number of quantization bits as small as one bit, by setting the sampling frequency to a sufficiently higher value. In addition, a sufficiently broad range of transmission may be assured.

On the other hand, the $\Sigma\Delta$ modulation circuit structure lends itself to integration, and high A/D conversion precision may be achieved rather easily, so that it is extensively used within A/D converters. The $\Sigma\Delta$ modulated signal can be restored to an analog audio signal by being passed through a simplified analog low-pass filter. By taking advantage of these characteristics, the $\Sigma\Delta$ modulation circuit may be applied to a recorder handling high-quality data, or to a high-quality data transmission system.

In the above-described digital audio data, if trouble occurs in the transmission system and bad data is produced, the data is fixed at "1" or "0". In digital audio data, continuous "1"s or "0"s correspond to a positive maximum value and a negative maximum value of the demodulated signal, respectively. For example, if part of the signal becomes defective in the transmission system, the maximum level noise is produced in the defective portion, thus possibly destroying a monitor amplifier or speaker.

Thus, in a CD or DAT for which the format for 16 bits is prescribed as the number of quantization bits, the signal format is set so that the continuous "1"s or "0"s assume an intermediate value in the demodulated signal without becoming a maximum level. Therefore, even if defective data is produced as described above, there is no risk of generation of the maximum noise level. Also, an error correction code is provided in the data so that data errors, if any, may be concealed to a pre-set extent. For data defects exceeding the ability of the error correction code, data lying ahead of or behind the defective data are used for interpolation, or data that is directly ahead of the defective data is held, in order to possibly avoid problems in connection with the listener's auditory sense.

For such interpolation, processing employing linear interpolation, as shown for example in FIG. 9, is performed. In FIG. 9, interpolated data $D_n$, where n is an integer from 1 to N, is found by the following equation (1):

$$D_n = D_A + n \times (D_B - D_A)/N \tag{1}$$

where N is the number of bad data, $D_A$ is data directly before the bad data, and $D_B$ is data directly following the bad data.

With $\Sigma\Delta$ modulation, however, since the word length of each data is short and is equal to 1 bit, for example, interpolation employing the preceding data or the succeeding data as described above cannot be made. Thus, a method known as the pre-hold method may be employed that consists of replacing the defective data portion by a block of the previous data of the same length as the defective data portion. This method is shown in FIG. 10, however, this method cannot be said to be completely useful however since the junction point is occasionally not smooth and an extremely large noise tends to be produced.

It may also be envisaged to transform data resulting from the above-mentioned $\Sigma\Delta$ modulation into data of the conventional signal format for CD or DAT using a decimation filter. If the modulated data is transformed into data of the conventional signal format as described above, it becomes possible to avoid any problem in connection with the human hearing mechanism by performing interpolation in the same way as conventionally or by holding the directly preceding data. The characteristics of the processed signals are assimilated to those of the conventional CD or DAT, however, so that the characteristics proper to the $\Sigma\Delta$ signals, such as broad bandwidths or high dynamic range, cannot be exploited.

Thus, if bad data is produced due to troubles in the transmission system, there is no means available in $\Sigma\Delta$ modulation for concealing the errors by interpolation, for example, so that it has been extremely difficult to exploit adequately the advantages of $\Sigma\Delta$ modulation in the usual transmission system.

OBJECTS AND SUMMARY OF THE INVENTION

In view of the above-described state of the art, it is an object of the present invention to provide a digital signal processing method and apparatus in which data errors generated at the time of transmission or recording/reproducing digital data obtained by digitization on the 1-bit basis may be interpolated by simplified arithmetic-logical operations.

According to one aspect of the present invention, this is accomplished by providing a digital signal processing method in which, if an error is produced in digital data obtained on 1-bit digitization at the time of interleaving and transmission or recording/reproduction, error data in the deinterleaved output is specified using the error detection information for interpolating the specified error data.

The interpolating step for interpolating specified error data multiplies a block composed of a pre-set number of unit data including the specified error data with a pre-set coefficient and multiplies data ahead of and behind the block containing the error with an increasing coefficient and with a decreasing coefficient, respectively.

For accomplishing the above object, the present invention also provides a digital signal processing apparatus, in which, if after digital data digitized on a 1-bit basis has been interleaved and an error detector detects errors in the transmitted or recorded/reproduced digital data, error data in deinterleaved output data obtained by a deinterleaving circuit is specified using the error detection information for interpolating the specified error data by an interpolation circuit.

The interpolating circuit multiplies a block composed of a pre-set number of unit data including the specified error data with a pre-set coefficient, multiplies data ahead of and behind the block with a variable coefficient, estimates the numbers of "1"s and "0"s of each block from an output of a multiplier, and decides the arraying pattern of the interpolated data in each block based on the results estimated by an estimating circuit and the error detection information detected by the error detector for generating interpolated data of the specified error data.

Moreover, according to the present invention a movement averaging filter having a pre-set value of coefficients of lost data width is used for lost data and data ahead and behind of the lost data for enabling the number to be estimated, using only the numbers of "1"s and "0"s as parameters, without resorting to the pattern or sequence of lost data. By interleaving during transmission and by deinterleaving during reception, lost data is dispersed bit-by-bit over a range larger than the possible range of estimation of "1"s and "0"s for estimating whether the lost one bit is "1" or "0" for enabling signal interpolation by a simple processing operation.

BRIEF DESCRIPTION OF THE DRAWINGS

FIGS. 4A–D are schematic views for explaining the operating principle of the interpolating unit in the interpolator shown in FIG. 3.

FIGS. 5A–5C are schematic views for illustrating the principle of movement averaging performed by the interpolator shown in FIG. 3.

FIGS. 7A–7D are waveform diagrams for illustrating that interpolation of the embodiment of FIG. 1 is performed with high precision.

DESCRIPTION OF THE PREFERRED EMBODIMENTS

Preferred embodiments of the digital signal processing method and apparatus according to the present invention will now be described in detail.

Figure 1:
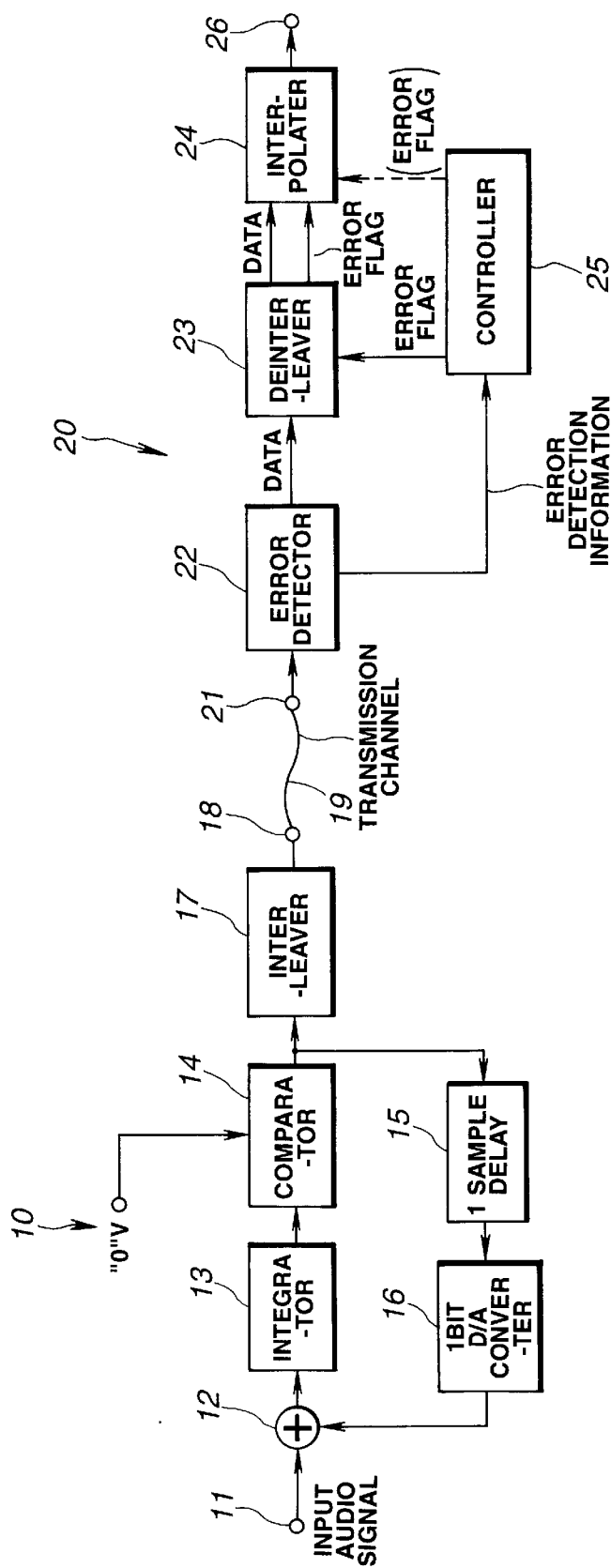
FIG. 1 is a schematic block diagram of a digital signal processing method and apparatus according to an embodiment of the present invention.

The embodiment shown in FIG. 1 is directed to a digital signal transmission/reception apparatus in which input signals are modulated in a transmitting unit 10 by $\Sigma\Delta$ modulation into 1-bit digital data, which is transmitted by a transmission channel 19 to a reception unit 20 from which a 1-bit output signal is derived. The transmitting unit 10 modulates the input audio signal with $\Sigma\Delta$ modulation into a 1-bit signal which is interleaved prior to transmission.

The manner in which $\Sigma\rightarrow$ modulation is performed is as follows: the input audio signal at an input terminal 11 is fed via an adder 12 to an integrator 13; a signal from the integrator 13 is fed to a comparator 14 where it is compared to, for example, a neutral point potential ("0" V) of the input audio signal and quantized on the 1-bit basis every sampling period; the frequency of the sampling period, that is, the sampling frequency, is 64 times or 128 times higher than the frequency of 48 kHz or 44.1 kHz conventionally employed; the quantized data is supplied to a one-sample delay unit 15 so as to be delayed one sampling period; the delayed data is supplied via a one-bit digital/analog (D/A) converter 16 to the adder 12 so as to be summed to the input audio signal from the input terminal 11; and the comparator 14 thus continuously outputs 1-bit audio data that has been $\Sigma\Delta$ modulated from the input audio data.

The continuous 1-bit audio data output by the comparator 14 is supplied to an interleaver 17 and thereby interleaved. The interleaver 17 disperses the input continuous 1-bit audio data over more than a specified range, as will be described below. Output data of the interleaver 17, which is the dispersed output data inclusive of the dispersed 1-bit audio data, is sent over the transmission channel 19 to the reception unit 20. In this example it is assumed that contiguous errors of a 4-bit width are produced in the transmission channel 19 so that the received data contains errors.

The reception unit 20 derives the error detection information from the dispersed output data transmitted by the transmission channel 19 and is responsive to the error detection information to specify error data in the deinterleaved output data in order to interpolate the specified error data. The dispersed output data received at an input terminal 21 over the transmission channel 19 is sent to an error detector 22, which then performs 4-bit width error detection on the dispersed output data. The dispersed output data after having been detected for errors by the error detector 22 is supplied to a deinterleaver 23. The deinterleaver 23 deinterleaves the dispersed output data and converts the dispersed output data into contiguous 1-bit audio data such as was present prior to interleaving, at the same time as it re-allocates the error detection information detected by the error detector 22 to corresponding bit positions. Output data of the deinterleaver 23 is fed to an interpolator 24. The interpolator 24 corrects error data in the output data from the deinterleaver 23 using the error detection information obtained by the error detector 22, in order to interpolate the specified error data. The interpolated 1-bit signals are output at an output terminal 26.

The error detection information detected by the error detector 22 is supplied to a controller 25 that is responsive to the error detection information to generate an error flag specifying in which portion of the output data the error data is present. The controller 25 transmits the generated error flag to the deinterleaver 23 that in turn transmits it to the interpolator 24. The deinterleaver 23 and the interpolator 24 are controlled in operation by the error flag supplied from the controller 25. If the deinterleaving is to be performed by the controller 25, the error flag may be supplied directly to the interpolator 24 as indicated by the broken line in FIG. 1. The interleaver 17 disperses the input contiguous 1-bit audio data over more than a specified range, as mentioned previously, and this dispersion over more than the specified range means that such dispersion exceeds the range in which the number of "1"s and "0"s can be estimated by the interpolator 24, with only the respective numbers of "1"s and "0"s as parameters. This will be explained in detail below.

Figure 2A:
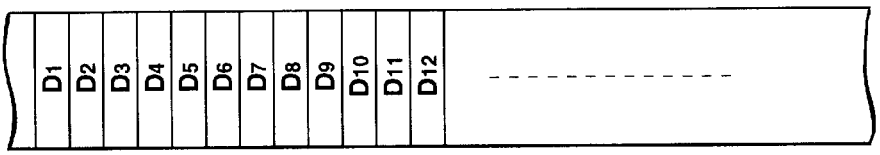
FIGS. 2A–2E schematically show data arrays for illustrating the operation of the embodiment shown in FIG. 1.
Figure 2B:
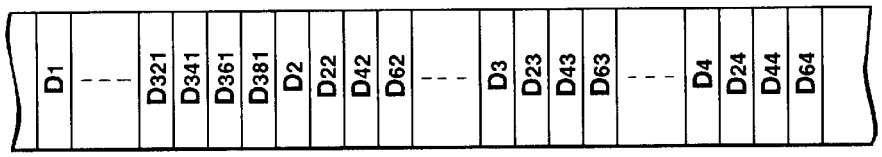

If contiguous 1-bit audio data, as shown in FIG. 2A, is supplied to the interleaver 17 the interleaver 17 performs interleaving such that it demarcates the contiguous 1-bit audio data into 4-bit widths and disperses each 1-bit data of the 4-bit width data to a position displaced by nineteen bits, as shown in FIG. 2B.

Figure 2C:
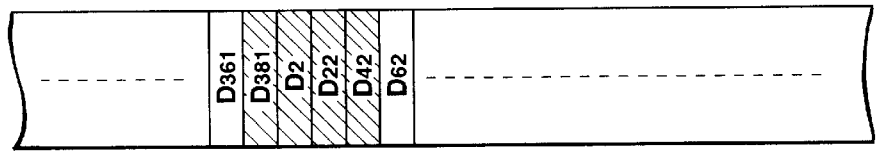
Figure 2D:
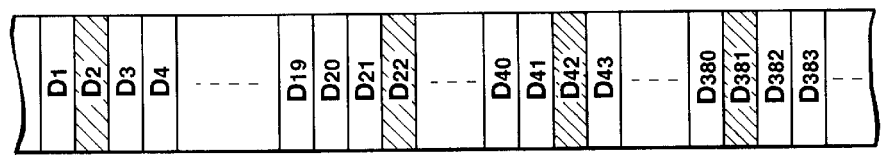
Figure 2E:
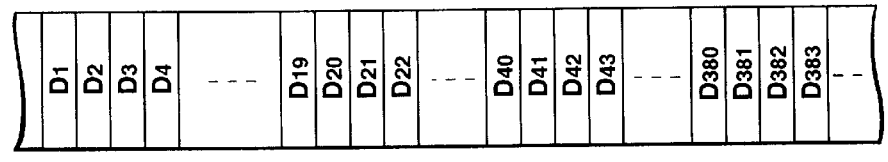

It is assumed that while the interleaved signals are transmitted over a transmission path 19 to the reception unit 20 continuous errors of, for example, 4-bit widths, have been generated, as shown in FIG. 2C. The 4-bit continuous errors are detected by the error detector 22. The deinterleaver 23 deinterleaves the interleaved 1-bit audio data, containing 4-bit-width continuous data, as shown in FIG. 2D. The result of the deinterleaving is that the contiguous error bits of four contiguous bits at the time of transmission become four 1-bit errors, dispersed at distances not less than nineteen bits. By bit width number estimation with respect to error positions, the number of 4-bit widths containing error places may be estimated. Since the error in the 4-bit width is only one bit, it becomes possible to estimate whether the 1-bit error is "1" or "0" and to execute interpolation inclusive of pattern generation.

The interpolator 24 for executing the number estimation and interpolation multiplies the bad data block made up of four 1-bit digital data, which is inclusive of 1-bit error data and which has been dispersed by deinterleaving caused by the deinterleaver 23, and the data ahead of and behind the bad data block with a coefficient of a pre-set value that remains constant over the bad data block and also with varying coefficients, respectively, for estimating the numbers of "1"s and "0"s present in the bad data block. As the amount of the total energy represented by the four 1-bit digital data words has been estimated, the interpolator 24 executes interpolation for determining the array pattern of "0"s and "1"s. In the absence of a so-called bad data block, the interpolator 24 outputs non-interpolated data in place of the interpolated data. That is, the non-interpolated data is the four 1-bit digital data in which there is no bad data.

Figure 3:
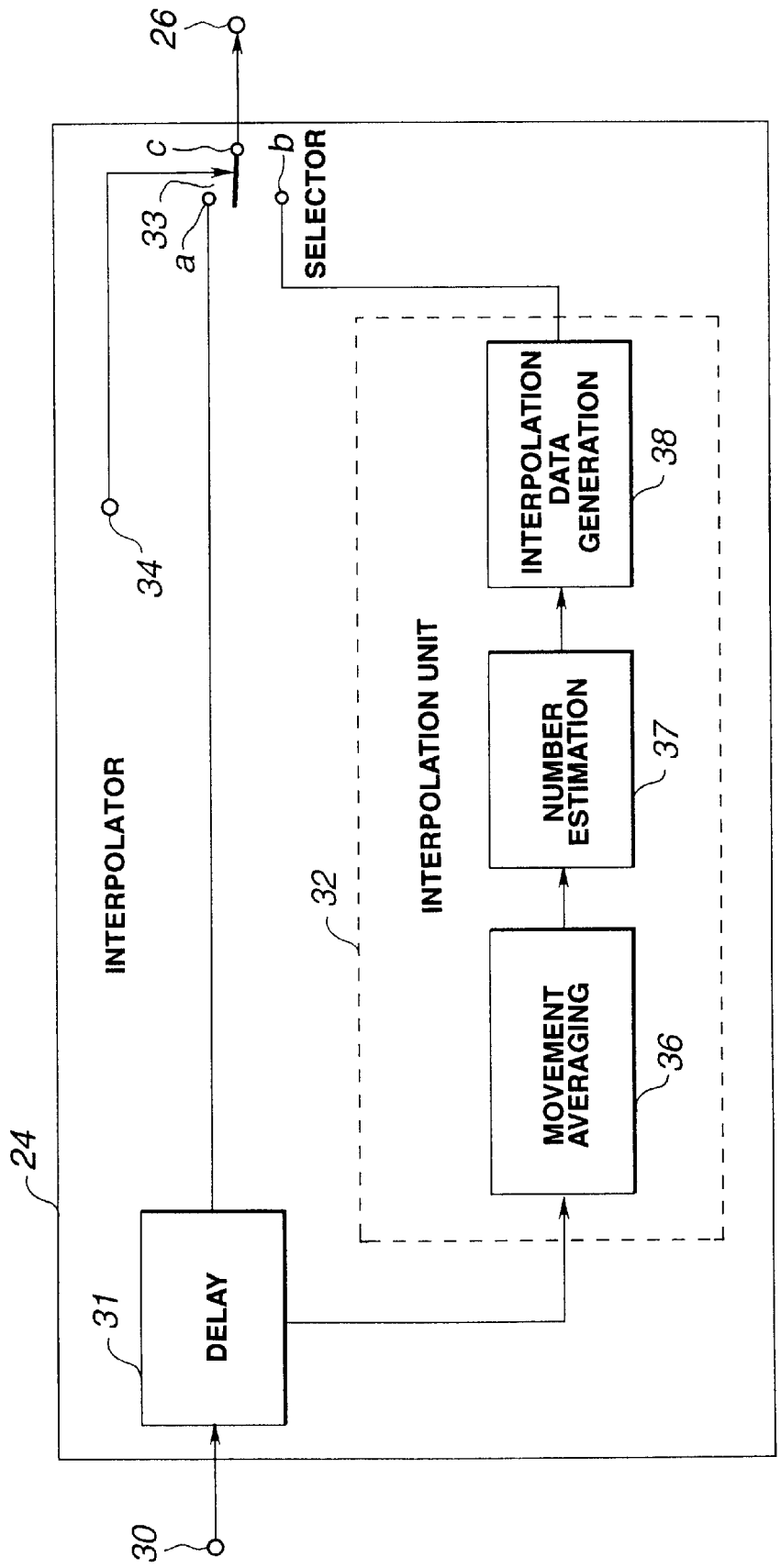
FIG. 3 is a block diagram showing a detailed structure of the interpolator employed in the embodiment of FIG. 1.

The interpolator 24 includes a delay unit 31 for delaying the four 1-bit digital data supplied via an input terminal 30 from the deinterleaver 17, an interpolation unit 32 for interpolating the four 1-bit digital data delayed by the delay unit 31, and a selector 33 for selectively switching between the non-interpolated data from the delay unit 31 and the interpolated data from the interpolating unit 32, as shown in FIG. 3 in response to a control signal fed in at terminal 34. The interpolator 32 includes a movement averaging processing circuit 36 for multiplying the bad data block with a pre-set coefficient and for multiplying the data ahead of and behind the bad data block with variable coefficients, a number estimation calculator 37 for estimating from the output of the movement averaging unit 36 the numbers of "1"s and "0"s making up the bad data block, and an interpolation data generator 38 for determining the array pattern of the bad data block based on the estimated results of the number estimation unit 37 and the error flag supplied from the controller 25 via the deinterleaver 25 for generating the interpolated data.

The selector 33 includes a first fixed contact a supplied with the non-interpolated data from the delay circuit 31, a second fixed contact b supplied with the interpolated data from the interpolator 32, and a movable contact c selectively connected to the contacts a or b in response to an interpolation on/off control signal supplied via the control signal terminal 34.

The principle of operation of the interpolator 24 is explained in connection with FIGS. 4A–4D, 5A–5C, and 6. The dispersed output data transmitted on the transmission channel 19 is assumed to suffer from, for example, four contiguous 1-bit errors, as shown in FIG. 2C. These errors were converted by the deinterleaver 23 into four 1-bit errors dispersed at distances spaced apart from each other by nineteen bits, as shown at in FIG. 2C. Of these, the 1-bit error data $D_{22}$ will be scrutinized in this example. The interpolation unit 32 interpolates a bad data block Bb in FIG. 4A, made up of 4-bit data, inclusive of the 1-bit error data $D_{22}$. First, the movement averaging circuit 36 performs two-stage movement averaging filtering of four and eight taps on the eleven correct 1-bit audio data $D_{11}$ to $D_{21}$ ahead of the bad data block $B_b$ shown in FIG. 4A, for deriving a movement averaged value $M_A$ at a point $P_A$ shown in FIG. 4D. In the 4-tap movement averaging processing the 1-bit digital audio data $D_{11}$ to $D_{21}$ shown in FIG. 4A is processed by 4-tap movement averaging such as $D_{11}$ to $D_{14}$, $D_{12}$ to $D_{15}$, $D_{13}$ to $D_{16}$, $D_{14}$ to $D_{17}$, $D_{15}$ to $D_{18}$, $D_{16}$ to $D_{19}$, $D_{17}$ to $D_{20}$, $D_{18}$ to $D_{21}$, for producing eight 4-tap movement averaged outputs, as shown in FIG. 4B. The movement averaging processing circuit 36 further performs eight-tap movement averaging on these eight 4-tap movement averaged outputs for producing an eight-tap movement averaged output shown in FIG. 4C in order to derive the movement averaged value $M_A$ at point $P_A$ shown in FIG. 4D.

The movement averaging processing circuit 36 also performs the above-described 2-stage movement averaging on the correct eleven 1-bit digital audio data behind the bad data block $B_b$ for deriving a movement averaged value $M_B$ at point $P_B$, as shown in FIGS. 4B–4D.

Figure 6:
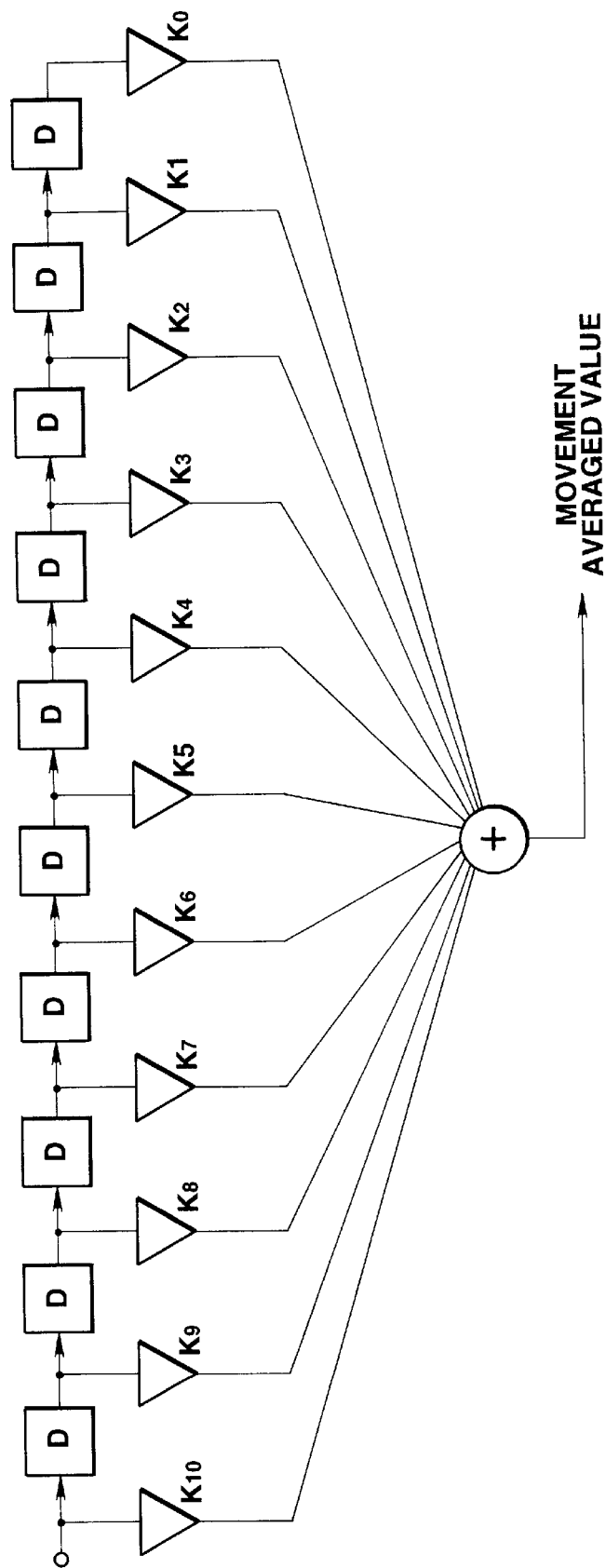
FIG. 6 schematically shows the structure of an FIR filter employed for movement averaging.
Figure 8:
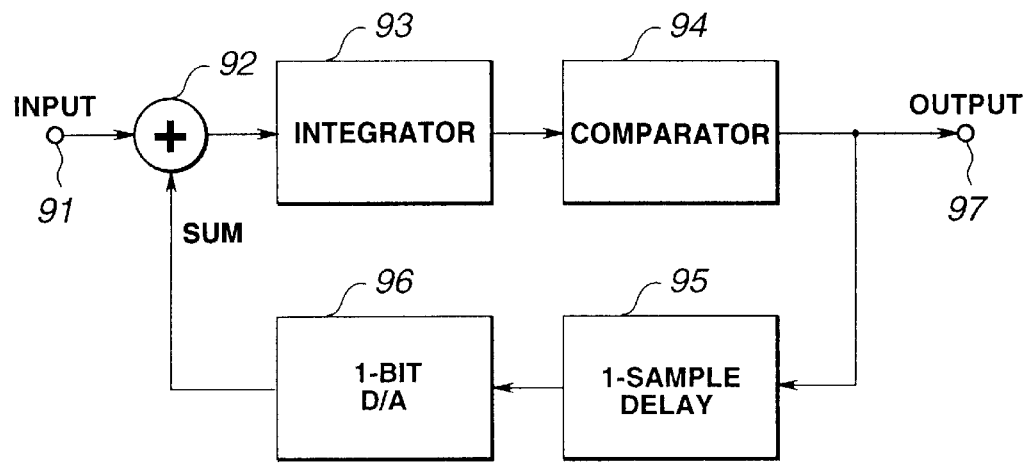
FIG. 8 is a schematic block diagram showing the structure of a $\Sigma\Delta$ modulation circuit outputting 1-bit digital data as previously known.
Figure 9:
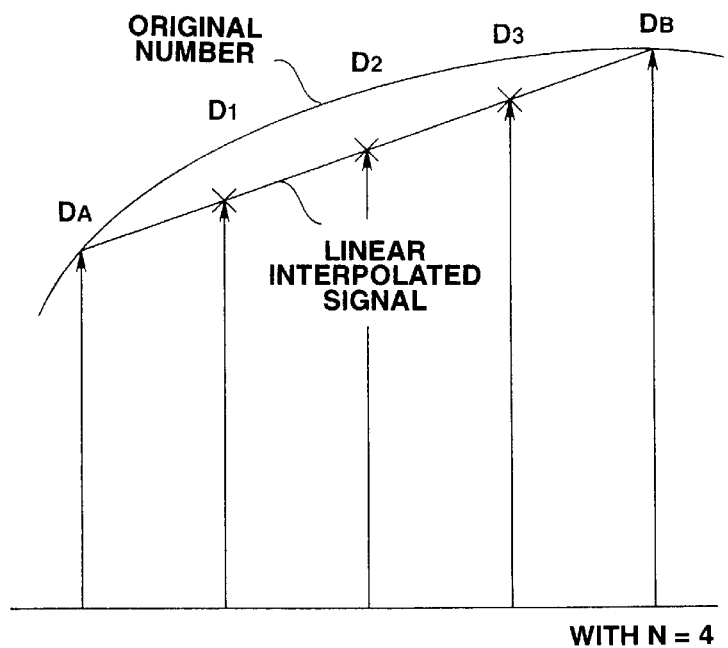
FIG. 9 is a graph for illustrating linear interpolation as previously known.
Figure 10:
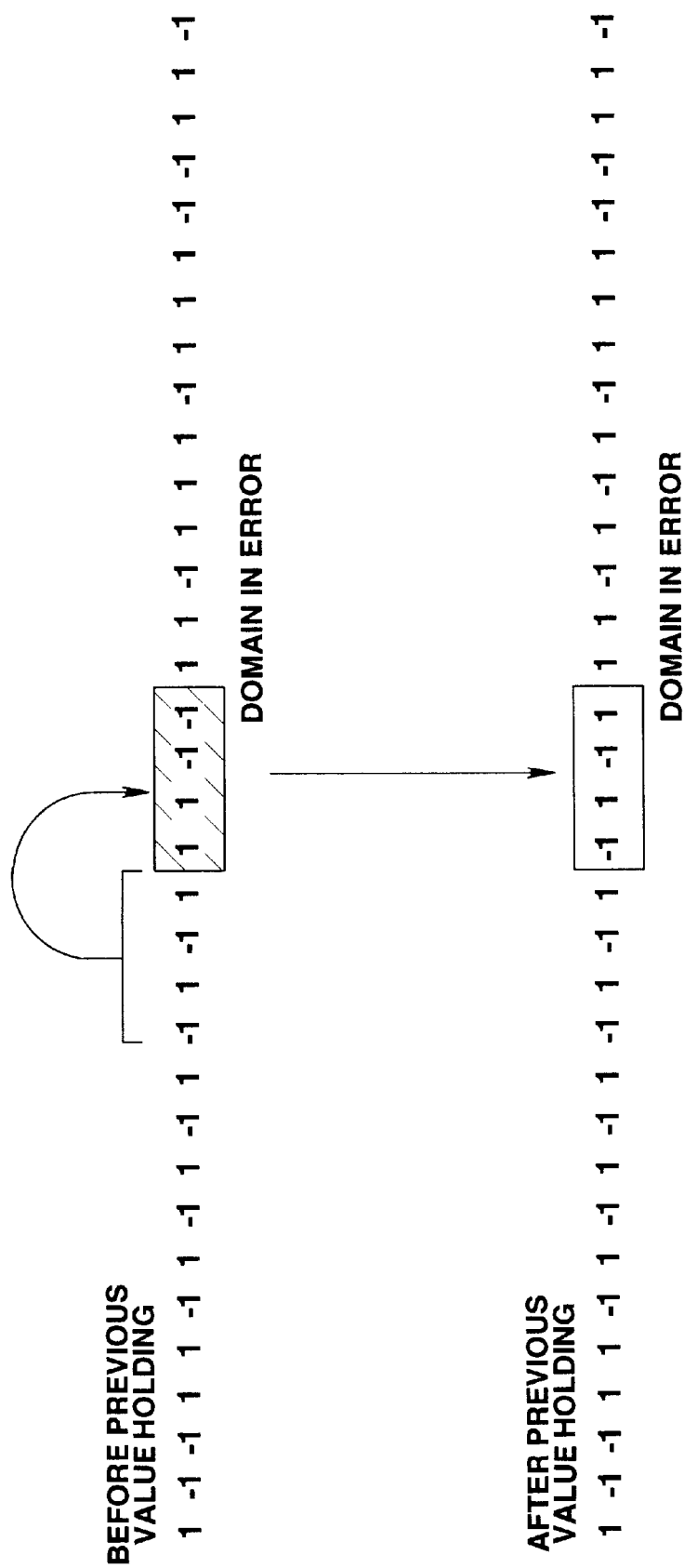
FIG. 10 illustrates a data string prior to pre-hold processing and a data string subsequent to pre-hold processing as previously known.

The two-stage movement averaging filter may be constituted by a 4-tap FIR filter and an 8-tap FIR filter. For simplifying the construction, however, it may be constituted by an 11-tap FIR filter, as shown in FIG. 6.

Using these derived movement averaged values $M_A$ and $M_B$, a center point $M_c$ of the error data is then calculated by linear interpolation by:

$$M_c'=(M_A+M_B)/2 \quad (2)$$

The movement averaged value $M_c$ may also be derived from the eleven 1-bit digital data $D_{19}$ to $D_{29}$ inclusive of the bad data block $B_b$. If an FIR filter as shown in FIG. 6 is used, this movement averaged value $M_c$ is given by $$M_c = \{D_{19} \times k_0 + D_{20} \times k_1 + D_{21} \times k_2 + D_{22} \times k_3 + D_{23} \times k_4 + D_{24} \times k_5 + D_{25} \times k_6 + D_{26} \times k_7 + D_{27} \times k_8 + D_{28} \times k_9 + D_{29} \times K_{10}\}/32 \quad (3)$$

In the above-described two-stage movement averaging by the movement averaging circuit 36, the 1-bit digital data $D_{19}$ to $D_{29}$ are processed with 4-tap movement averaging as shown in FIG. 4B to produce eight 4-tap movement averaged outputs, which are then processed with 8-tap movement averaging. Thus the movement averaged value $M_c$ becomes $$M_c = \{(D_{19}+D_{20}+D_{21}+D_{22})/4 + (D_{20}+D_{21}+D_{22}+D_{23})/4 + D_{21}+D_{22} + D_{23}+D_{24})/4 + (D_{22}+D_{23}+D_{24}+D_{25})/4 + (D_{23}+D_{24}+D_{25}+D_{28})/$$

$$4 + (D_{26}+D_{27}+D_{28}+D_{26})/4\}/8 = \{D_{19} \times 1 + D_{19} \times 1 + D_{21} \times 3 + (D_{22}+D_{23} + D_{24}+D_{25}) \times 4 + D_{26} \times 4 + D_{27} \times 3 + D_{28} \times 2 + D_{29} \times 1\}/32 \quad (4)$$

The unknowns are error data $D_{22}$, $D_{23}$, $D_{24}$, and $D_{25}$ of the bad data block Bb shown in FIG. 5A. The coefficients $k_3$ to $k_6$ are associated with these terms and have a constant value of "4", as shown in FIG. 5B, because of identity of equations (3) and (4) the coefficients $k_0$ to $k_2$ rise in value to the right since $k_0=1$, $k_1=2$, and $k_2=3$, as shown in FIG. 5B. The coefficients $k_7$ to $k_{10}$ decay in value to the right since $k_7=4$, $k_8=3$, $k_9=2$, and $k_{10}=1$. The movement averaging circuit 36 performs two-stage averaging using these coefficients shown in FIG. 5B.

Thus, even if the arraying pattern of "1"s and "0"s for the four error data $D_{22}$, $D_{23}$, $D_{24}$, and $D_{25}$ making up the bad data block $B_b$ is not known, the movement averaged value Mc may be determined based on the numbers of "1"s and "0"s. The number estimation circuit 37 estimates the numbers of "1"s and "0"s. The number estimation circuit 37 estimates the numbers of "1"s and "0"s from the following equation that is obtained by setting $M_c \approx M_c'$:

$$(D_{22}+D_{23}+D_{24}+D_{25}) \approx \{M_c'-(D_{19} \times 1 + D_{20} \times 2 + D_{21} \times 3 + D_{26} \times 4 + D_{27} \times 3 + D_{28} \times 2 + D_{29} \times 1)\}/4 \quad (5)$$

If, in the above equation, $D(1)=1$ and $D(0)=-1$, the number estimation circuit 37 estimates the numbers of "1"s and "0"s by $(D_{22}+D_{23}+D_{24}+D_{25}) \approx 4$ - - - >"1": four, "0": zero $(D_{22}+D_{23}+D_{24}+D_{25}) \approx 2$ - - - >"1": three, "0": one $(D_{22}+D_{23}+D_{24}+D_{25}) \approx 0$ - - - >"1": two, "0": two $(D_{22}+D_{23}+D_{24}+D_{25}) \approx -2$ - - - >"1": one, "0": three $(D_{22}+D_{23}+D_{24}+D_{25}) \approx -1$ - - - >"1": zero, "0": four By performing this moving averaging by the moving averaging circuit 36 so that the coefficient values will be constant over an error data width, the number estimation circuit 37 is able to estimate the numbers of "1"s and "0"s in the error data easily. Although the four-tap and eight-tap two-stage moving averaging is performed on 4-bit errors, the number of bits, the number of taps, or the number of stages is not limited to those values and may be varied as desired.

If the numbers of "1"s and "0"s in the error data can be estimated as described above by the number estimation circuit 37, it becomes possible to maintain the total energy proper to 1-bit digital data. Thus, it is sufficient if the interpolation data generating circuit 38 determines the arraying pattern of "1"s and "0"s of the interpolated data to generate the interpolated data while the energy amount determined by the number of "1"s and "0"s is maintained. For example, if the number of "1"s and the number of "0"s are both two, five patterns of 0011, 0101, 1001, 1010, and 1100 may be thought of as candidate interpolation patterns. Thus, it is sufficient if these five arraying patterns are fitted to the defective data block $B_b$.

Since the error data in the bad data block $B_b$ is only one bit $D_{22}$, the interpolation pattern may be generated only on estimation of whether the 1-bit error is "1" or "0". That is, with the present embodiment of the digital signal transmitting/receiving apparatus, error data can be interpolated by simplified processing operations.

Referring to the method for determining the arraying pattern, moving average values of $D_2$ to $D_{12}$ in case of substituting "0"s and "1"s for $D_{22}$ in the defective data block $B_b$ are found.

The moving average values thus found are compared to be linear interpolated value of an interval between $P_A$ and $P_B$ of FIG. 4D as a reference value of the moving average and the moving average closer to the reference value is accepted as a correct value.

The moving average values $D_{13}$ and $D_{23}$ are then found by substituting "0"s and "1"s for $D_{23}$.

The moving average values thus found are compared to the reference value of the linearly interpolated moving average and the moving average value closer to the reference value is accepted as correct data.

This operation is repeated for each bit of the defective data block to decide the bits as being "0" or "1". Since the numbers of "0"s and "1"s was previously found, the operation is terminated on reaching these numbers.

The interpolation processor 32 interpolates the defective data block $B_b$ in this manner and routes the resulting data to the selection terminal b of the selector 33. If fed with an interpolation ON control signal from the controller 25 via the control signal terminal 34, the interpolation circuit 24 connects the movable contact c of the selector 33 to the selection terminal b for outputting the interpolated data at the output terminal 26.

With the present embodiment of the digital signal transmitting/receiving apparatus, interpolation can be achieved as error data generation is suppressed to the extent that error data may be said to have been restored. The reason is that 1-bit estimation in the interpolation pattern in the interpolation data generator 38 suffices, thus enabling reliable interpolation, that is, restoration. FIG. 7D shows an illustrative signal interpolated by the present digital signal transmitting/receiving apparatus and restored into an analog signal. For comparison, FIG. 7C shows a signal interpolated from error data without employing interleaving and deinterleaving, as described above.

The digital signal processing method and apparatus according to the present invention are applicable not only to the digital signal transmitting/receiving apparatus but also to a digital audio recording/reproducing apparatus for recording/reproducing 1-bit digital data on or from a tape-shaped recording medium or an optical recording medium. Similar processing may be achieved with the bit width of not less than 4 bits by increasing the interleaving width.

The interleaving is not limited to the re-arraying as shown in FIG. 2B, but may also comprise a simple delay-type rearraying.

If, as the digital data produced by 1-bit digitization is interleaved and recorded or reproduced, errors are detected in the transmitted or recorded/reproduced digital data and the error data in the deinterleaved output data is identified and interpolated by the interpolating circuits with the aid of the error detection information, with the digital signal processing method of the present invention the 1-bit digital data lost during transmission may be interpolated highly accurately by simple processing operations.

If, as the digital data produced by 1-bit digitization is interleaved by the interleaving circuit and recorded or reproduced, errors are detected in the transmitted or recorded/reproduced digital data by the error detection circuit, the error data in the deinterleaved output data by the deinterleaving circuit is identified and interpolated by the interpolating circuit with the aid of the error detection information, with the digital signal processing apparatus of the present invention the 1-bit digital data lost during transmission may be interpolated highly accurately by simple processing operations.

Although the present invention has been described hereinabove with reference to the preferred embodiment, it is to be understood that the invention is not limited to such illustrative embodiment alone and various modifications may be contrived without departing from the spirit or essential characteristics thereof, which are to be determined solely from the appended claims.

What is claimed is:

1. An interpolation apparatus for interpolating a defective data block constituted by a predetermined number of bits that was produced during transmission of interleaved digital data digitized by $\Sigma\Delta$ modulation, the apparatus comprising:

error detecting means for detecting defective data of the interleaved $\Sigma\Delta$ modulated digital signal;

control means for generating a digital error flag corresponding to the defective data in response to error detection information from the error detecting means;

de-interleave means for de-interleaving the interleaved $\Sigma\Delta$ modulated digital signal; and interpolation means for replacing the defective data of the de-interleaved digital signal with interpolated data including an averaging unit for multiplying at least the defective data with predetermined coefficients, estimating means for estimating a data pattern of the output from the averaging unit, and interpolation data generating means for determining interpolated data of the defective data based upon the data pattern estimated by the estimating means and producing a $\Sigma\Delta$ modulated digital signal with an interpolated defective data block.

2. The interpolation apparatus according to claim 1, wherein the estimating means estimates the data pattern by estimating the numbers of "0"s and "1"s contained in the predetermined number of bits making up the defective data based on the output of the averaging unit.

3. The interpolation apparatus according to claim 1, wherein the data pattern of the interpolated data is determined from an arraying pattern candidate estimated by the estimating means.

4. An interpolation apparatus for interpolating a defective data block constituted by a predetermined number of bits, said defective data block having been produced during transmission of interleaved digital signal digitized by $\Sigma\Delta$ modulation, the apparatus comprising:

an error detector for detecting defective data contained in the interleaved $\Sigma\Delta$ modulated digital signals;

means for generating an error flag corresponding to the defective data in accordance with error detection information from the error detector;

a de-interleave unit for de-interleaving the interleaved $\Sigma\Delta$ modulated digital signals; and an interpolator for replacing the defective data contained in selected de-interleaved digital signal with substitute data, wherein the interpolator includes a moving averaging unit for multiplying the defective data block with a predetermined coefficient and data ahead of and behind the defective data block with predetermined variable coefficients, an estimator for estimating a replacement data pattern of the de-interleaved digital signals based upon an output result of the averaging unit, and an interpolated data generator for determining the substitute data for the defective data block based upon the replacement data pattern estimated by the estimator and producing a $\Sigma\Delta$ modulated digital signal with a defective data block having been interpolated.

5. A receiving apparatus for receiving an interleaved digital data signal digitized by $\Sigma\Delta$ modulation from a transmitting means, comprising:

error detecting means for detecting defective data contained in the interleaved $\Sigma\Delta$ modulated digital data signal;

control means for generating error flag information corresponding to a location in the interleaved $\Sigma\Delta$ modulated digital data signal of the defective data in accordance with error detection information from the error detecting means;

de-interleave means for de-interleaving the interleaved $\Sigma\Delta$ modulated digital signal and for receiving the error flag information from the control means; and interpolation means for replacing the defective data with interpolated data based upon a replacement data pattern generated by estimating a number of "1"s and "0"s contained in the defective data and producing a $\Sigma\Delta$ modulated digital data signal having defective data replaced with interpolated data.

6. The receiving apparatus according to claim 5, wherein the interpolation means comprises an estimating circuit for estimating the number of "0"s and "1"s contained in the defective data.

7. The receiving apparatus according to claim 6, wherein a correct replacement data pattern is determined from an arraying pattern candidate estimated by the estimating means, said correct replacement data pattern being used as the interpolated data.

8. A transmitting and receiving apparatus in which a transmitting unit transmits interleaved digital data to a receiving unit, comprising:

converting means for converting an input analog audio signal into a digital data stream digitized by a $\Sigma\Delta$ modulation method;

interleave means for interleaving data in the $\Sigma\Delta$ modulated digital data stream from the converting means;

error detecting means for detecting defective data present in the interleaved $\Sigma\Delta$ modulated digital data stream from the interleave means;

control means for generating digital error flag information corresponding to a location of the defective data in accordance with error detection information from the error detecting means;

de-interleave means receiving the interleaved $\Sigma\Delta$ modulated digital data stream and the error detection information for de-interleaving the interleaved digital data stream; and interpolation means for replacing the defective data in the de-interleaved digital signal with substitute data and including estimating means for estimating a data pattern of the substitute data based on a moving average of the energy contained in the defective data, and interpolated data generating means for determining interpolated data for the defective data based upon the data pattern of the substitute data estimated by the estimating means and producing a $\Sigma\Delta$ modulated digital data stream having defective data replaced with interpolated data.

9. The transmitting and receiving apparatus according to claim 8, wherein the estimating means estimates the numbers of "0"s and "1"s contained in a predetermined number of bits making up each block of data in the interleaved digital data transmitted by the transmitting unit.

10. The transmitting and receiving apparatus according to claim 8, wherein correct substitute data is determined from an arraying pattern candidate estimated by the estimating means, the correct substitute data being used as the interpolated data.

* * * * *